United States Patent [19]

Yamada et al.

[11] 3,947,544
[45] Mar. 30, 1976

[54] METHOD OF CLEANING EXHAUST GASES

[75] Inventors: Mitsumasa Yamada, Shizuoka; Youji Kitamura, Kariya, both of Japan

[73] Assignees: Nippondenso Co., Ltd., Kariya; Toyota Jidosha Kogyo Kabushiki Kaisha, Toyota, both of Japan

[22] Filed: Dec. 18, 1973

[21] Appl. No.: 425,731

Related U.S. Application Data

[62] Division of Ser. No. 191,880, Oct. 22, 1971, abandoned.

[30] Foreign Application Priority Data

Dec. 26, 1970 Japan.............................. 46-140313

[52] U.S. Cl. .................... 423/212; 60/286; 60/289; 60/298
[51] Int. Cl.²......................................... B01D 53/34
[58] Field of Search ......... 23/277 C, 288 P; 60/288, 60/289, 286, 290, 299, 298; 423/212, 213, 214

[56] References Cited

UNITED STATES PATENTS

| | | | |
|---|---|---|---|
| 3,168,806 | 2/1965 | Calvert...................... | 23/288 F UX |
| 3,172,738 | 3/1965 | Houdry.............................. | 23/288 F |
| 3,203,168 | 8/1965 | Thomas .............................. | 60/286 |
| 3,236,044 | 2/1966 | Ruge............................... | 60/289 X |

OTHER PUBLICATIONS

Kirk-Othmer; Encyclopedia of Chemical Technology; 2nd Ed. Vol. 2, pp. 829–830, Interscience Pub.; N.Y.; 1964.

Primary Examiner—G. O. Peters
Attorney, Agent, or Firm—Cushman, Darby & Cushman

[57] ABSTRACT

Internal combustion exhaust gases are catalytically treated and cleaned in a catalyst bed in contact with the exhaust gas conduit of the engine while avoiding overheating and thermal distriction of the catalyst bed according to the present invention by selectively directing a continuous source of heated, secondary air into the catalyst bed then, when the catalyst reaches a predetermined temperature value, the heated air is discharged directly to the atmosphere cooling the exhaust gases, and reducing the temperature of the catalyst bed. The exhaust pipe, upstream of the catalyst, is provided with a double walled conduit and the secondary air is continuously passed through the outer conduit and selectively directed into the catalyst bed or vented to the atmosphere depending upon temperature conditions in the catalyst bed.

1 Claim, 2 Drawing Figures

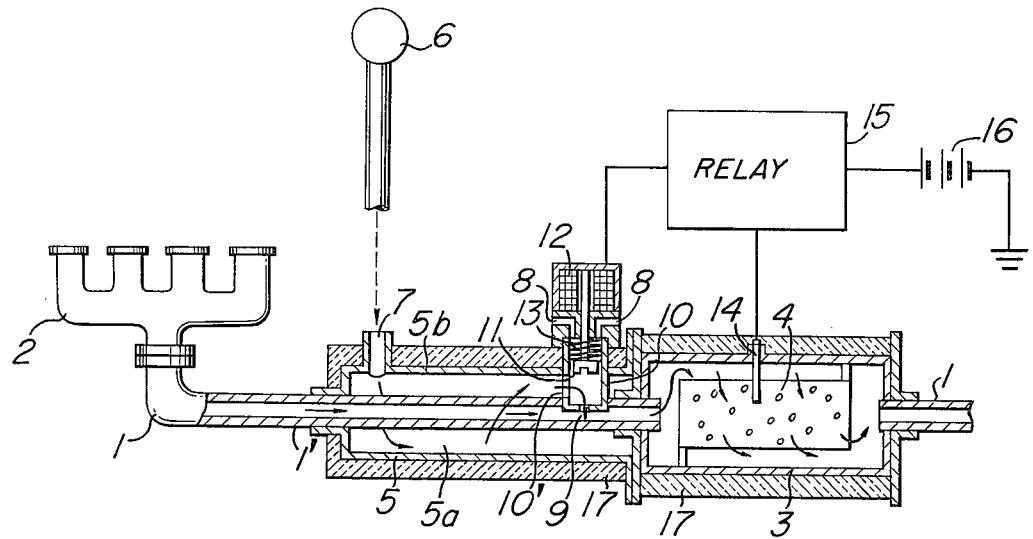
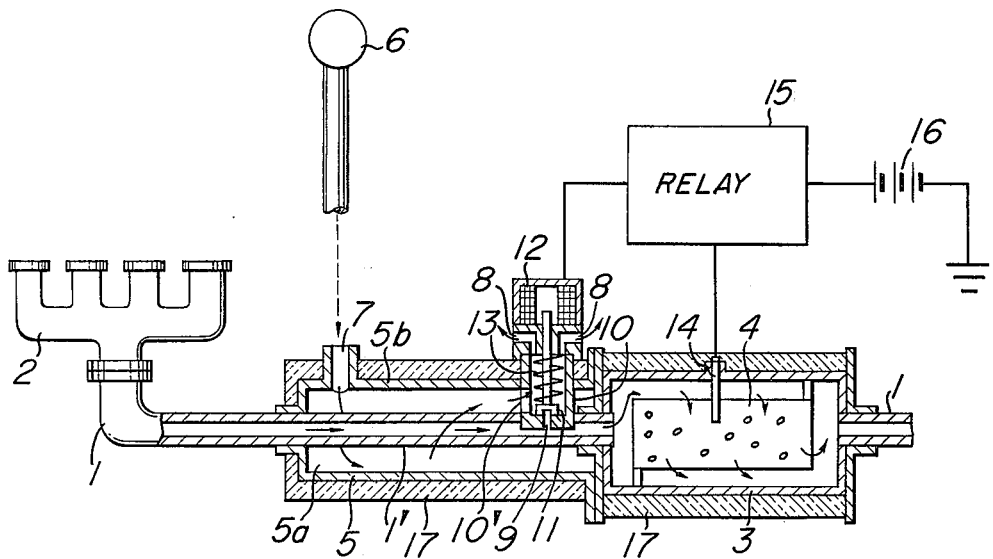

METHOD OF CLEANING EXHAUST GASES

CROSS REFERENCE TO RELATED APPLICATIONS

This application is a division of our earlier application Ser. No. 191,880 filed Oct. 22, 1971 and now abandoned.

BACKGROUND OF THE INVENTION

1. Field of the Invention

This invention relates to devices for cleaning the exhaust gases exhausted particularly from internal combustion engines, and more specifically to improvements in the secondary air supply means of the exhaust gas cleaning devices of the type in which the exhaust gases are burned or catalytically reacted in a reaction chamber, provided intermediate of the exhaust pipe, with secondary air introduced thereinto, whereby the toxic unburned components in said exhaust gases are oxidized and rendered innoxious.

2. Description of the Prior Art

Conventional exhaust gas cleaning devices of the type described comprise a reaction chamber, i.e., a direct flame type or catalytic combustion chamber or catalyst means, provided intermediate of the exhaust pipe connected with the exhaust manifold, and means for supplying secondary air from an air pump into the exhaust pipe upstream of said reaction chamber. In such exhaust gas cleaning devices, it has been proposed to construct the upstream side of the exhaust pipe with respect to the reaction chamber into a double wall structure and supply the secondary air to be mixed with the exhaust gases through the outer chamber surrounding the inner wall of the exhaust pipe so that said secondary air may be heated by the heat of the exhaust gases. Such an arrangement of the secondary air supply means is effective for maintaining the temperature of the exhaust gases and thereby promoting the combustion or catalytic action with the reaction chamber because, since the heat of the exhaust gases is absorbed by the secondary air once and then returned to said exhaust gases, substantially no heat is released from the exhaust gases into the atmosphere. However, on some occasions, an undesirably intense combustion or catalytic reaction takes place within the reaction chamber depending upon the operating condition of the internal combustion engine, resulting in overheating of the catalyst or the structural members of the reaction chamber and thermal failure of the same. Under such an operating condition of the engine, the temperature of the exhaust gases also becomes high and accordingly the temperature of the exhaust pipe becomes excessively high. In order to deal with such problems, it has been proposed to provide a bypass valve on the exhaust pipe at a location upstream of the reaction chamber and bypass the exhaust gases so as to pass them through the reaction chamber. However, such an arrangement is defective in that the exhaust pipe diverges into two lines and becomes complicated in construction.

SUMMARY OF THE INVENTION

In order to eliminate the above defect, the present invention has for its object the provision of secondary air supply means of the exhaust gas cleaning devices of the type described, which comprises a portion of the exhaust pipe upstream of the reaction chamber which is constructed into a double wall structure having an inner wall defining an exhaust gas passage and an outer wall defining between it and said inner wall an outer chamber for the passage of secondary air therethrough so that said secondary air may be heated by the exhaust gases before it is mixed with the exhaust gases, valve means for opening and closing a secondary air supply hole formed in said inner wall and a secondary air releasing hole formed in said outer wall, a temperature detector disposed within said reaction chamber and valve operating means for electromagnetically, pneumatically or hydraulically operating said valve means in response to a signal from said temperature detector in such a manner that when the temperature detected by said temperature detector is below a predetermined level, the secondary air supply hole is opened and the secondary air releasing hole is closed, while when the temperature becomes higher than the predetermined level, the secondary air supply hole is closed and the secondary air releasing hole is opened.

According to the present invention, when the internal temperature of the reaction chamber is below a predetermined level, the secondary air passing in the outer chamber of the double walled portion of the exhaust pipe is heated by the heat of the exhaust gases and the heated secondary air is mixed with the exhaust gases to be introduced into the reaction chamber, so that satisfactory cleaning of the exhaust gases can be achieved. On the other hand, when the internal temperature of the reaction chamber rises to a level to cause thermal destruction of the catalyst or the structural members of the reaction chamber, the secondary air supply hole is closed and the secondary air releasing hole is opened by the valve means operating in response to the signal from the temperature detector and the heated secondary air is released into the atmosphere, so that the secondary air only serves to cool the inner wall of the double walled portion of the exhaust pipe and is not supplied into the reaction chamber. Therefore, the exhaust gas cleaning reaction does not substantially take place within the reaction chamber and the reaction chamber is cooled to the temperature of the exhaust gases, and thus overheating of said reaction chamber can be avoided. Since it is unnecessary to provide an additional exhaust gas bypass pipe, the secondary air supply means of the present invention has the advantage that it renders the construction of the entire exhaust gas cleaning device simple and the mounting of the exhaust gas cleaning device on the underside of the automobile floor extremely easy.

BRIEF DESCRIPTION OF THE DRAWING

FIG. 1 is a vertical sectional view of an embodiment of the secondary air supply means of exhaust gas cleaning devices according to the present invention, under normal operating condition, and FIG. 2 is a vertical sectional view similar to FIG. 1 but showing the position when the internal temperature of the reaction chamber has reached a critical level to cause thermal destruction of the catalyst bed.

DESCRIPTION OF THE PREFERRED EMBODIMENT

FIGS. 1 and 2 show a catalytic exhaust gas cleaning device embodying the present invention. An exhaust pipe 1 is connected with the exhaust manifold 2 of an internal combustion engine not shown. A reaction chamber 3 with a catalyst bed 4 disposed therein is provided intermediate of the exhaust pipe 1. The portion 5 of the exhaust pipe 1 upstream of the reaction chamber 3 is constructed into a double wall structure having an inner wall 1' defining an exhaust gas passage and an outer wall 5b defining an outer chamber 5a around said inner wall 1'. The outer wall 5b is provided with an air inlet port 7 on the upstream side thereof for introducing secondary air from an air pump 6 into the outer chamber 5a and air releasing holes 8 on the downstream side for releasing the secondary air into the atmosphere. The inner wall 1' is provided with a secondary air supply hole 9. These holes 8, 9 are communicated with a hole 10' formed in the side wall of a cylindrical valve casing 10. In the valve casing 10 is received a valve 11 which is moved up and down by a magnet 12 and a spring 13, to close the holes 8 and 9 alternately. A temperature detector 14 is provided extending into the catalyst bed 4. A relay 15 is electrically connected with a power source 16, the magnet 12 and the temperature detector 14, which will conduct a current to the magnet 12 when the temperature of the catalyst bed detected by the temperature detector 14 is below a predetermined level sufficiently lower than a level at which the catalyst is thermally destructed, and will interrupt the current supply to said magnet 12 when said temperature becomes higher than said predetermined level. The outer wall 5b and the reaction chamber 3 are enclosed by a heat insulating material.

The secondary air supply means of the invention constructed as described above operates in the following manner: Namely, at the start of the internal combustion engine the temperature of the catalyst bed 4 within the reaction chamber 3 is still low, so that a current is supplied to the magnet 12 through the relay 15. As a result, the valve 11 is lifted to the position shown in FIG. 1, closing the secondary air releasing holes 8 and communicating the secondary air supply hole 9 with the hole 10' formed in the valve casing 10. The secondary air from the air pump 6 flows into the outer chamber 5a of the double walled portion 5 from the secondary air inlet port 7 and is supplied into the exhaust gas passage 1' through the holes 10' and 9. During passage in the outer chamber 5a, the secondary air is heated by the exhaust gases passing in the exhaust gas passage 1' and conversely said exhaust gases are cooled by the secondary air. However, since the outer wall 5b of the double walled portion 5 of the exhaust pipe 1 is enclosed by the heat insulating material 17, little heat of the secondary air is released into the atmosphere and the heated secondary air is supplied from the secondary air supply port 9 into the exhaust gases in the heated state. Therefore, the amount of heat which is lost by the exhaust gases during passage in the double walled portion 5 of the exhaust pipe 1 is substantially entirely returned to the exhaust gases at an inlet of the reaction chamber 3 and the heat loss of the exhaust gases is very small. Thus, the exhaust gases are mixed with the heated secondary air and pass through the catalyst bed 4. During passage through the catalyst bed 4, carbon monoxide and hydrocarbons in the exhaust gases are oxidized into carbon dioxide and water by the catalytic activity of the catalyst. In this case, heat is generated elevating the temperature of the catalyst bed 4 and elevating the catalytic reaction temperature, so that the temperature of the catalyst bed 4 rises quickly to a level sufficiently higher than the temperature of the exhaust gases. Under such condition, however, since the temperature of the exhaust gases passing through the catalyst bed 4 is lower than the temperature of said catalyst bed, the catalyst bed is cooled by the exhaust gases and the catalytic reaction continuously takes place at a constant temperature at which the heat lost by the catalyst bed is balanced by the heat generated by the catalytic reaction. However, when the temperature of the exhaust gases flowing through the catalyst bed 4 is extremely high as in the case of high load, high speed operation of the engine, the catalyst bed 4 is overheated by the reaction heat generated therein, inducing thermal destruction of said catalyst bed. According to the present invention, the relay 15 is actuated in response to a signal from the temperature detector 14 and the current supply to the magnet 12 is interrupted before the temperature of the catalyst bed 4 reaches such a high level, whereby the valve 11 is moved down by the spring 13 closing the secondary air supply hole 9 and communicating the hole 10' in the valve casing 10 with the secondary air releasing hole 8 as shown in FIG. 2. Therefore, the secondary air flowing into the outer chamber 5a and heated therein by the exhaust gases is released into the atmosphere through the opening 10' in the valve casing 10 and the secondary air releasing hole 8, without being allowed to flow into the exhaust gas passage 1'. In this case, the exhaust gases are only cooled and not mixed with the secondary air in the double walled portion 5 of the exhaust pipe 1, so that they are substantially not subjected to the catalytic reaction during passage through the catalyst bed 4. Thus, overheating of the catalyst bed 4 can be prevented.

Although in the embodiment described above the valve 11 to open and close the secondary air supply hole 9 is electromagnetically operated by the magnet 12, it is to be understood that said valve may be operated by arranging such that an air cylinder or hydraulic cylinder is provided in the place of said magnet 12 and air pressure, hydraulic pressure or negative air pressure to operate said cylinder is interrupted intermittently by an electromagnetic three-way valve which is controllably operated by the relay 15. Still alternatively, the valve 11 may be operated by making use of the drive of an electric motor. Further, the valve 11 may be a dual valve adapted to open and close the secondary air releasing hole 8 and the secondary air supply hole 9 independently of each other.

In the present invention, as described herein, a portion of the exhaust pipe upstream of the reaction chamber of the exhaust gas cleaning device is constructed into a double wall structure having an inner wall defining an exhaust gas passage and an outer wall defining a secondary air passage around said inner wall, so that the secondary air may be heated in said secondary air passage by the heat exchange with the exhaust gases before it is mixed with the exhaust gases, and a valve is provided to open and close a secondary air supply hole formed in said inner wall and an air releasing hole formed in said outer wall for releasing the secondary air into the atmosphere therethrough, and further a temperature detector is disposed within said reaction chamber, the operation of said valve being controlled by internal temperature of the reaction chamber detected by said temperature detector such that when the interior of said reaction chamber is overheated, the supply of the secondary air into the exhaust gas passage is interrupted and the secondary air introduced into the secondary air passage cools the inner wall of the double walled portion of the exhaust pipe and is released into the atmosphere from the air releasing hole. Therefore, the secondary air supply means of the invention has such excellent advantage that overheating of the reaction chamber can be prevented by a compact, simple structure not including an additional exhaust gas bypass pipe and that the exhaust gas cleaning device can be mounted on the underside of the automobile floor very easily even when only a limited space is available for the mounting of said device.

We claim:

1. A method of catalytically treating and cleaning internal combustion exhaust gases comprising hydrocarbons and carbon monoxide while avoiding overheating and thermal destruction of the catalyst bed under operating conditions, said method including:

providing a catalyst-containing reaction area communicated to the exhaust gas conduit of an internal combustion engine;

supplying exhaust gases to the catalyst reaction area from an operating internal combustion engine;

supplying from a pumping means secondary air in contact with the heated exhaust conduit of the engine and heating the secondary air prior to introduction into the catalyst reaction area;

directing the heated secondary air into the catalyst reaction area together with the exhaust gases causing the hydrocarbons and carbon monoxide components of the exhaust gases to be oxidized by the catalyst to carbon dioxide and water, and discharging the reaction products, including the cleaned and heated exhaust gases, to the atmosphere;

discontinuing the supply of heated secondary air to the catalyst reaction area while continuing the supply of secondary air in contact with the heated exhaust conduit and discharging this heated air directly to the atmosphere when the temperature of the catalyst reaches a predetermined temperature prior to thermal destruction of the catalyst, causing the exhaust gases passing into the catalyst reaction area to be cooled and substantially or completely discontinue the catalytic reaction occurring in the reaction area, thereby effectively reducing the temperature of the catalyst bed; and continuing to supply the heated secondary air to the catalyst reaction area when the catalyst bed has returned to the temperature below the predetermined temperature.

* * * * *